(12) United States Patent
Yoshioka (10) Patent No.: US 8,769,588 B2
(45) Date of Patent: Jul. 1, 2014

(54) BROADCASTING RECEIVER AND TELEVISION SET

(75) Inventor: Shinji Yoshioka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 117 days.

(21) Appl. No.: 13/210,688

(22) Filed: Aug. 16, 2011

(65) Prior Publication Data

US 2012/0054807 A1    Mar. 1, 2012

(30) Foreign Application Priority Data

Aug. 25, 2010 (JP) .................... 2010-188577

(51) Int. Cl.
| | | |
|---|---|---|
| H04N 7/18 | (2006.01) | |
| H04L 12/28 | (2006.01) | |
| H04N 21/4363 | (2011.01) | |
| H04N 21/442 | (2011.01) | |
| H04N 7/10 | (2006.01) | |

(52) U.S. Cl.
CPC ...... *H04N 21/44209* (2013.01); *H04L 12/2801* (2013.01); *H04N 7/106* (2013.01); *H04N 21/43632* (2013.01); *H04L 12/2838* (2013.01); *H04L 12/2834* (2013.01)
USPC .............. 725/85; 725/135; 370/431; 370/465

(58) Field of Classification Search
USPC .............. 370/310.2, 328, 338, 322, 329, 341, 370/348, 431
See application file for complete search history.

(56) References Cited

U.S. PATENT DOCUMENTS

| | | | |
|---|---|---|---|
| 6,188,871 | B1 | 2/2001 | Kitamura et al. |
| 6,687,308 | B1 | 2/2004 | Inose et al. |
| 2006/0072505 | A1* | 4/2006 | Carrillo et al. ............... 370/331 |
| 2007/0186270 | A1* | 8/2007 | Kang et al. ................... 725/135 |
| 2011/0001833 | A1* | 1/2011 | Grinkemeyer et al. ....... 348/192 |

FOREIGN PATENT DOCUMENTS

| | | | | |
|---|---|---|---|---|
| JP | 3683327 | B2 | 8/1997 | |
| JP | 2000-209279 | A | 7/2000 | |
| JP | 2003-078831 | | * 3/2003 | ............... H04N 5/44 |
| JP | 2003-78831 | A | 3/2003 | |
| JP | 3563886 | B2 | 9/2004 | |
| JP | 3757086 | B2 | 3/2006 | |

* cited by examiner

*Primary Examiner* — Rong Le
(74) *Attorney, Agent, or Firm* — Crowell & Moring LLP (57) ABSTRACT

This broadcasting receiver includes a receiving portion capable of receiving a digital television broadcast signal, a transmitting portion capable of transmitting a network signal and a control portion establishing a network on coaxial wiring when a frequency band allocated for transmitting the digital television broadcast signal on the coaxial wiring includes a free frequency band having a bandwidth larger by a prescribed bandwidth than a bandwidth of the network signal.

19 Claims, 4 Drawing Sheets

CHANNEL MAP

| BROAD-CASTER | RECEIVED FREQUENCY |
|---|---|
| PBS | ***** |
| DTV_SD | ***** |
| DTV_HD | ***** |
| WPBA_HD | ***** |
| WPBA_SD | ***** |
| Weather | ***** |
| ⋮ | ⋮ |
| MPA_HD | ***** |
| MPA_SD | ***** |

FIG.5

BROADCASTING RECEIVER AND TELEVISION SET

BACKGROUND OF THE INVENTION

1. Field of the Invention

The present invention relates to a broadcasting receiver and a television set, and more particularly, it relates to a broadcasting receiver and a television set each including a control portion establishing a network on coaxial wiring.

2. Description of the Background Art

A broadcasting receiver including a control portion establishing a network on coaxial wiring is known in general, as disclosed in Japanese Patent Laying-Open No. 2003-78831, for example.

The aforementioned Japanese Patent Laying-Open No. 2003-78831 discloses a broadcasting receiver establishing a network with another apparatus connected to in-home coaxial wiring by employing a free frequency band in a frequency band allocated for transmitting a broadcast signal (digital television broadcast signal, for example) on the in-home coaxial wiring to transmit/receive a signal of video data or the like.

In the aforementioned Japanese Patent Laying-Open No. 2003-78831, however, the signal (network signal) of video data or the like is conceivably transmitted in the free frequency band even if the bandwidth of the free frequency band is relatively small. In this case, the frequency band of the network signal and the frequency band of the digital television broadcast signal approach each other or overlap with each other, whereby the network signal and the digital television broadcast signal disadvantageously interfere with each other. Therefore, in the aforementioned Japanese Patent Laying-Open No. 2003-78831, the quality of the digital television broadcast signal is disadvantageously deteriorated when establishing the network employing the free frequency band in the frequency band allocated for transmitting the digital television broadcast signal on the in-home coaxial wiring.

SUMMARY OF THE INVENTION

The present invention has been proposed in order to solve the aforementioned problem, and an object of the present invention is to provide a broadcasting receiver and a television set each capable of inhibiting the quality of a digital television broadcast signal from deterioration when establishing a network employing a free frequency band in a frequency band allocated for transmitting the digital television broadcast signal on coaxial wiring.

A broadcasting receiver according to a first aspect of the present invention includes a receiving portion capable of receiving a digital television broadcast signal through coaxial wiring, a transmitting portion capable of transmitting a network signal having a bandwidth larger than that of the digital television broadcast signal through the coaxial wiring, and a control portion establishing a network on the coaxial wiring when a frequency band allocated for transmitting the digital television broadcast signal on the coaxial wiring includes a free frequency band having a bandwidth larger by a prescribed bandwidth than a bandwidth of the network signal.

In the broadcasting receiver according to the first aspect of the present invention, as hereinabove described, the control portion is formed to establish the network on the coaxial wiring when the frequency band allocated for transmitting the digital television broadcast signal on the coaxial wiring includes the free frequency band having the bandwidth larger by the prescribed bandwidth than the bandwidth of the network signal. Thus, a free frequency band having a prescribed bandwidth can be provided between the network signal and the digital television broadcast signal when the network is established by employing the free frequency band on the coaxial wiring to transmit the network signal, and hence the network signal and the digital television broadcast signal can be inhibited from interfering with each other. Consequently, the quality of the digital television broadcast signal can be inhibited from deterioration when the network is established employing the free frequency band in the frequency band allocated for transmitting the digital television broadcast signal on the coaxial wiring. It is not necessary to secure a frequency band dedicated for transmission of the network signal on the coaxial wiring when the network can be established employing the free frequency band in the frequency band allocated for transmitting the digital television broadcast signal on the coaxial wiring. Thus, the bandwidth of a frequency band that can be employed by a service provider utilizing the coaxial wiring to provide a new service can be increased.

In the aforementioned broadcasting receiver according to the first aspect, the control portion is preferably formed to scan the digital television broadcast signal through the receiving portion and determine whether or not the frequency band allocated for transmitting the digital television broadcast signal on the coaxial wiring includes the free frequency band having the bandwidth larger by the prescribed bandwidth than the bandwidth of the network signal on the basis of a result of scanning of the digital television broadcast signal. According to this structure, the presence of the free frequency band in the frequency band allocated for transmitting the digital television broadcast signal on the coaxial wiring can be easily detected by allowing the receiving portion to scan the digital television broadcast signal.

In this case, the control portion is preferably formed to prepare a channel map by scanning the digital television broadcast signal and determine whether or not the frequency band allocated for transmitting the digital television broadcast signal on the coaxial wiring includes the free frequency band having the bandwidth larger by the prescribed bandwidth than the bandwidth of the network signal on the basis of the prepared channel map. According to this structure, the presence of the free frequency band in the frequency band allocated for transmitting the digital television broadcast signal on the coaxial wiring can be more easily detected on the basis of the channel map.

In the aforementioned broadcasting receiver according to the first aspect, the control portion is preferably formed to adjust a frequency band of the network signal such that a center frequency of the network signal is substantially equal to a center frequency of the free frequency band and transmit the network signal through the transmitting portion when establishing the network on the coaxial wiring by transmitting the network signal through the transmitting portion. According to this structure, the free frequency band can be reliably provided on both sides closer to the lower limit frequency and the upper limit frequency of the network signal dissimilarly to a case where the center frequency of the network signal deviates from the center frequency of the free frequency band, and hence the quality of the digital television broadcast signal can be reliably inhibited from deterioration.

In the aforementioned broadcasting receiver according to the first aspect, the free frequency band preferably includes a plurality of free frequency bands, and the control portion is preferably formed to establish the network employing the free frequency band having the largest bandwidth among the plurality of free frequency bands. According to this structure, the bandwidth of the free frequency band in the frequency band allocated for transmitting the digital television broadcast signal on the coaxial wiring can be rendered the largest among available free frequency bands, and hence the quality of the digital television broadcast signal can be further inhibited from deterioration.

In the aforementioned broadcasting receiver according to the first aspect, the control portion is preferably formed to establish the network on the coaxial wiring employing a prescribed frequency band previously set other than the frequency band allocated for transmitting the digital television broadcast signal when the frequency band allocated for transmitting the digital television broadcast signal on the coaxial wiring does not include the free frequency band having the bandwidth larger by the prescribed bandwidth than the bandwidth of the network signal. According to this structure, the network signal can be transmitted employing the prescribed frequency band previously set other than the frequency band allocated for transmitting the digital television broadcast signal on the coaxial wiring even if the frequency band allocated for transmitting the digital television broadcast signal on the coaxial wiring does not include the free frequency band for transmitting the network signal, and hence the network can be reliably established on the coaxial wiring.

The aforementioned broadcasting receiver scanning the digital television broadcast signal preferably further includes a storage portion storing the result of scanning of the digital television broadcast signal, wherein the control portion is formed to determine again whether or not the frequency band allocated for transmitting the digital television broadcast signal on the coaxial wiring includes the free frequency band having the bandwidth larger by the prescribed bandwidth than the bandwidth of the network signal on the basis of the result of scanning of the digital television broadcast signal stored in the storage portion and reestablish the network on the coaxial wiring on the basis of a result of determination when the network is not properly established on the coaxial wiring. According to this structure, the free frequency band employed when the network is reestablished can be easily detected on the basis of the result of scanning of the digital television broadcast signal stored in the storage portion.

In the aforementioned broadcasting receiver according to the first aspect, the control portion is preferably formed to establish the network on the coaxial wiring when the frequency band allocated for transmitting the digital television broadcast signal on the coaxial wiring includes the free frequency band having a bandwidth at least twice the bandwidth of the network signal. According to this structure, the free frequency band can be easily provided between the network signal and the digital television broadcast signal when the network is established by employing the free frequency band on the coaxial wiring to transmit the network signal, and hence the network signal and the digital television broadcast signal can be easily inhibited from interfering with each other. Consequently, the quality of the digital television broadcast signal can be easily inhibited from deterioration when the network is established employing the free frequency band in the frequency band allocated for transmitting the digital television broadcast signal on the coaxial wiring.

In the aforementioned broadcasting receiver according to the first aspect, the transmitting portion is preferably formed to be capable of transmitting the network signal complying with a MoCA standard, and the control portion is preferably formed to establish the network complying with the MoCA standard on the coaxial wiring when the frequency band allocated for transmitting the digital television broadcast signal on the coaxial wiring includes the free frequency band having a bandwidth larger by a prescribed bandwidth than a bandwidth of the network signal complying with the MoCA standard. According to this structure, a free frequency band having a prescribed bandwidth can be provided between the network signal complying with the MoCA standard and the digital television broadcast signal when the network complying the MoCA standard is established by employing the free frequency band on the coaxial wiring to transmit the network signal complying with the MoCA standard, and hence the network signal complying with the MoCA standard and the digital television broadcast signal can be easily inhibited from interfering with each other. Consequently, the quality of the digital television broadcast signal can be easily inhibited from deterioration when the network complying with the MoCA standard is established employing the free frequency band in the frequency band allocated for transmitting the digital television broadcast signal on the coaxial wiring.

In this case, the control portion is preferably formed to establish the network complying with the MoCA standard on the coaxial wiring when the broadcasting receiver functions as a management apparatus managing the network complying with the MoCA standard. According to this structure, the network complying with the MoCA standard can be prevented from being established by a broadcasting receiver not functioning as the management apparatus.

A television set according to a second aspect of the present invention includes a receiving portion capable of receiving a digital television broadcast signal through coaxial wiring, a transmitting portion capable of transmitting a network signal having a bandwidth larger than that of the digital television broadcast signal through the coaxial wiring, and a control portion establishing a network on the coaxial wiring when a frequency band allocated for transmitting the digital television broadcast signal on the coaxial wiring includes a free frequency band having a bandwidth larger by a prescribed bandwidth than a bandwidth of the network signal.

In the television set according to the second aspect of the present invention, as hereinabove described, the control portion is formed to establish the network on the coaxial wiring when the frequency band allocated for transmitting the digital television broadcast signal on the coaxial wiring includes the free frequency band having the bandwidth larger by the prescribed bandwidth than the bandwidth of the network signal. Thus, a free frequency band having a prescribed bandwidth can be provided between the network signal and the digital television broadcast signal when the network is established by employing the free frequency band on the coaxial wiring to transmit the network signal, and hence the network signal and the digital television broadcast signal can be inhibited from interfering with each other. Consequently, the quality of the digital television broadcast signal can be inhibited from deterioration when the network is established employing the free frequency band in the frequency band allocated for transmitting the digital television broadcast signal on the coaxial wiring. It is not necessary to secure a frequency band dedicated for transmission of the network signal on the coaxial wiring when the network can be established employing the free frequency band in the frequency band allocated for transmitting the digital television broadcast signal on the coaxial wiring. Thus, the television set in which the bandwidth of a frequency band that can be employed by a service provider utilizing the coaxial wiring to provide a new service can be increased can be provided.

In the aforementioned television set according to the second aspect, the control portion is preferably formed to scan the digital television broadcast signal through the receiving portion and determine whether or not the frequency band allocated for transmitting the digital television broadcast signal on the coaxial wiring includes the free frequency band having the bandwidth larger by the prescribed bandwidth than the bandwidth of the network signal on the basis of a result of scanning of the digital television broadcast signal. According to this structure, the presence of the free frequency band in the frequency band allocated for transmitting the digital television broadcast signal on the coaxial wiring can be easily detected by allowing the receiving portion to scan the digital television broadcast signal.

In this case, the control portion is preferably formed to prepare a channel map by scanning the digital television broadcast signal and determine whether or not the frequency band allocated for transmitting the digital television broadcast signal on the coaxial wiring includes the free frequency band having the bandwidth larger by the prescribed bandwidth than the bandwidth of the network signal on the basis of the prepared channel map. According to this structure, the presence of the free frequency band in the frequency band allocated for transmitting the digital television broadcast signal on the coaxial wiring can be more easily detected on the basis of the channel map.

In the aforementioned television set according to the second aspect, the control portion is preferably formed to adjust a frequency band of the network signal such that a center frequency of the network signal is substantially equal to a center frequency of the free frequency band and transmit the network signal through the transmitting portion when establishing the network on the coaxial wiring by transmitting the network signal through the transmitting portion. According to this structure, the free frequency band can be reliably provided on both sides closer to the lower limit frequency and the upper limit frequency of the network signal dissimilarly to a case where the center frequency of the network signal deviates from the center frequency of the free frequency band, and hence the quality of the digital television broadcast signal can be reliably inhibited from deterioration.

In the aforementioned television set according to the second aspect, the free frequency band preferably includes a plurality of free frequency bands, and the control portion is preferably formed to establish the network employing the free frequency band having the largest bandwidth among the plurality of free frequency bands. According to this structure, the bandwidth of the free frequency band in the frequency band allocated for transmitting the digital television broadcast signal on the coaxial wiring can be rendered the largest among available free frequency bands, and hence the quality of the digital television broadcast signal can be further inhibited from deterioration.

In the aforementioned television set according to the second aspect, the control portion is preferably formed to establish the network on the coaxial wiring employing a prescribed frequency band previously set other than the frequency band allocated for transmitting the digital television broadcast signal when the frequency band allocated for transmitting the digital television broadcast signal on the coaxial wiring does not include the free frequency band having the bandwidth larger by the prescribed bandwidth than the bandwidth of the network signal. According to this structure, the network signal can be transmitted employing the prescribed frequency band previously set other than the frequency band allocated for transmitting the digital television broadcast signal on the coaxial wiring even if the frequency band allocated for transmitting the digital television broadcast signal on the coaxial wiring does not include the free frequency band for transmitting the network signal, and hence the network can be reliably established on the coaxial wiring.

The aforementioned television set scanning the digital television broadcast signal preferably further includes a storage portion storing the result of scanning of the digital television broadcast signal, wherein the control portion is formed to determine again whether or not the frequency band allocated for transmitting the digital television broadcast signal on the coaxial wiring includes the free frequency band having the bandwidth larger by the prescribed bandwidth than the bandwidth of the network signal on the basis of the result of scanning of the digital television broadcast signal stored in the storage portion and reestablish the network on the coaxial wiring on the basis of a result of determination when the network is not properly established on the coaxial wiring. According to this structure, the free frequency band employed when the network is reestablished can be easily detected on the basis of the result of scanning of the digital television broadcast signal stored in the storage portion.

In the aforementioned television set according to the second aspect, the control portion is preferably formed to establish the network on the coaxial wiring when the frequency band allocated for transmitting the digital television broadcast signal on the coaxial wiring includes the free frequency band having a bandwidth at least twice the bandwidth of the network signal. According to this structure, the free frequency band can be easily provided between the network signal and the digital television broadcast signal when the network is established by employing the free frequency band on the coaxial wiring to transmit the network signal, and hence the network signal and the digital television broadcast signal can be easily inhibited from interfering with each other. Consequently, the quality of the digital television broadcast signal can be easily inhibited from deterioration when the network is established employing the free frequency band in the frequency band allocated for transmitting the digital television broadcast signal on the coaxial wiring.

In the aforementioned television set according to the second aspect, the transmitting portion is preferably formed to be capable of transmitting the network signal complying with a MoCA standard, and the control portion is preferably formed to establish the network complying with the MoCA standard on the coaxial wiring when the frequency band allocated for transmitting the digital television broadcast signal on the coaxial wiring includes the free frequency band having a bandwidth larger by a prescribed bandwidth than a bandwidth of the network signal complying with the MoCA standard. According to this structure, a free frequency band having a prescribed bandwidth can be provided between the network signal complying with the MoCA standard and the digital television broadcast signal when the network complying the MoCA standard is established by employing the free frequency band on the coaxial wiring to transmit the network signal complying with the MoCA standard, and hence the network signal complying with the MoCA standard and the digital television broadcast signal can be easily inhibited from interfering with each other. Consequently, the quality of the digital television broadcast signal can be easily inhibited from deterioration when the network complying with the MoCA standard is established employing the free frequency band in the frequency band allocated for transmitting the digital television broadcast signal on the coaxial wiring.

In this case, the control portion is preferably formed to establish the network complying with the MoCA standard on the coaxial wiring when the television set functions as a management apparatus managing the network complying with the MoCA standard. According to this structure, the network complying with the MoCA standard can be prevented from being established by a television set not functioning as the management apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a home network 1 including a television set 10 according to an embodiment of the present invention is described with reference to FIG. 1. The home network 1 is an example of the "network" in the present invention. The television set 10 is an example of the "broadcasting receiver" in the present invention.

Figure 1:
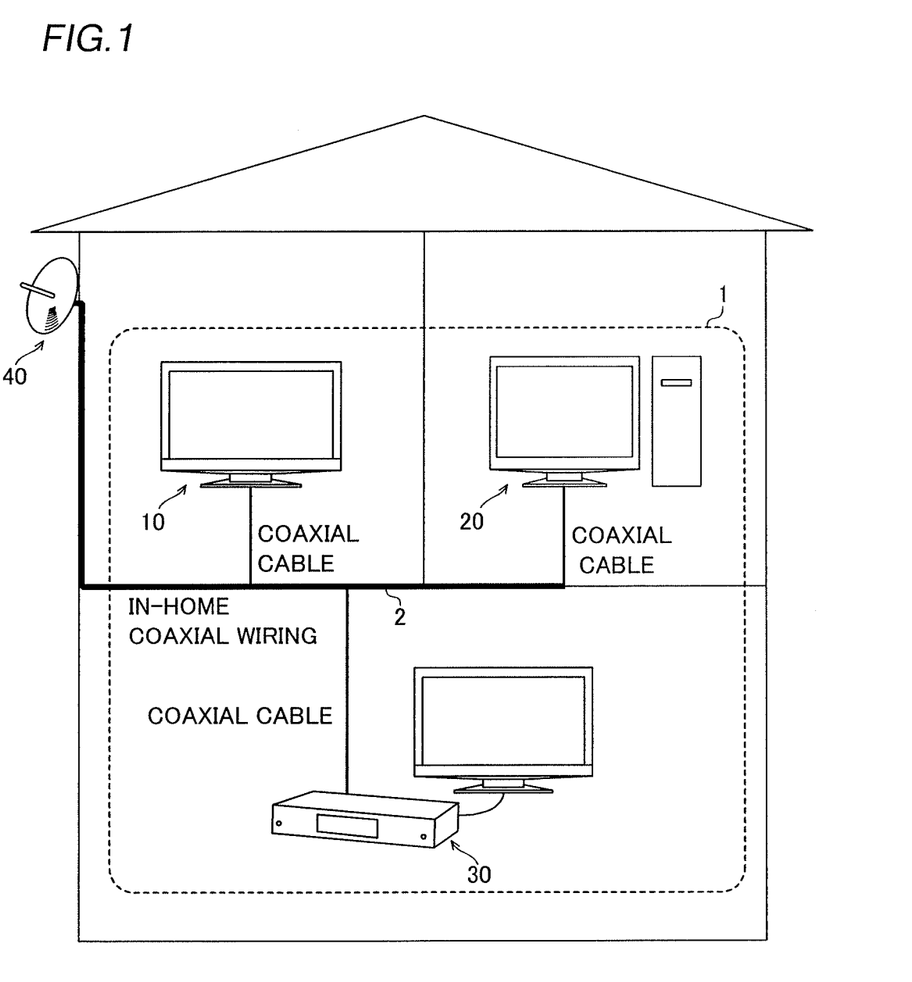
FIG. 1 is an image diagram showing the structure of a home network including a television set according to an embodiment of the present invention.

The home network 1 is constituted by in-home coaxial wiring 2, the television set 10, a PC (personal computer) 20 and a set-top box 30, as shown in FIG. 1. The in-home coaxial wiring 2 is constituted by coaxial cables having a characteristic impedance of 75Ω, for example. The in-home coaxial wiring 2 is connected to an antenna 40 receiving digital television broadcasting distributed from each broadcaster on the basis of the ATSC standard (Advanced Television Systems Committee standard).

The television set 10, the PC 20 and the set-top box 30 are connected to the in-home coaxial wiring 2 through the coaxial cables. The television set 10, the PC 20 and the set-top box 30 each have a network communication function capable of transmitting/receiving video data or the like through the in-home coaxial wiring 2. The MoCA standard (Multimedia over Coax Alliance standard) is known as a communication standard of a network employing coaxial wiring.

The MoCA standard is now schematically described with reference to FIG. 2.

In the MoCA standard, fourteen communication channels (channels A1, B1, C1, C2, C3, C4, D1, D2, D3, D4, D5, D6, D7 and D8) each having a bandwidth of 50 MHz in a frequency band from 850 MHz to 1525 MHz on coaxial wiring are defined as communication channels employed to transmit/receive a network signal such as a beacon signal described later. Further, in the MoCA standard, each node, which is a constituent unit of a network, is formed to establish a network on the coaxial wiring by selectively employing the aforementioned fourteen communication channels to transmit/receive the network signal.

In the MoCA standard, one node is selected from among a plurality of nodes (apparatuses) included in the single network as an NC (network coordinator) node (management apparatus). The NC node denotes a node having a function of managing a network, and the television set 10 functions as the NC node in this embodiment. For example, the NC node has a function of transmitting a beacon signal for informing all other nodes on the coaxial wiring of the presence of a network and allowing a node outside the network to join the network.

When a network according to the MoCA standard is established, the NC node first transmits the beacon signal on the coaxial wiring. Then, another node on the coaxial wiring having received the beacon signal returns a signal that the node wishes to join the network to the NC node. Then, the NC node having received the signal that the node wishes to join the network determines whether or not to allow the node to join the network, and the network is established.

Next, the structure of the television set 10 according to the embodiment of the present invention is described with reference to FIG. 3.

Figure 3:
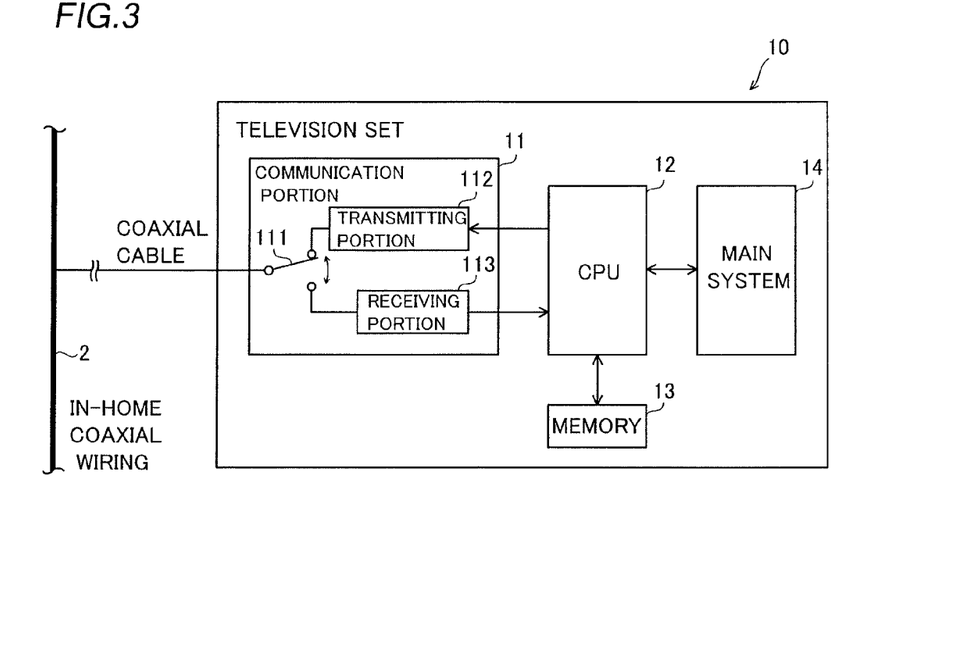
FIG. 3 is a block diagram showing the structure of the television set according to the embodiment of the present invention.

The television set 10 according to the embodiment of the present invention is constituted by a communication portion 11, a CPU 12, a memory 13 and a main system 14, as shown in FIG. 3. The CPU 12 is an example of the "control portion" in the present invention. The memory 13 is an example of the "storage portion" in the present invention.

The communication portion 11 is connected to the in-home coaxial wiring 2 through the coaxial cable. The communication portion 11 can perform communication complying with the MoCA standard described above. The communication portion 11 is constituted by a switch 111, a transmitting portion 112 and a receiving portion 113.

The switch 111 is formed to switch between a connection between the coaxial cable and the transmitting portion 112 and a connection between the coaxial cable and the receiving portion 113 in a time-divided manner. The transmitting portion 112 can transmit a network signal according to the MoCA standard. This network signal according to the MoCA standard has a bandwidth of 50 MHz, as described above.

The receiving portion 113 can receive the network signal according to the MoCA standard through the coaxial cable. The receiving portion 113 can receive a digital television broadcast signal according to the ATSC standard from the antenna 40 (see FIG. 1) through the in-home coaxial wiring 2. This digital television broadcast signal according to the ATSC standard has a bandwidth of 6 MHz.

The CPU 12 can control the entire television set 10. The memory 13 is formed to store various programs executed by the CPU 12. The memory 13 is formed to store a channel map (see FIG. 4) described later. The main system 14 is constituted by various devices for fulfilling an image display function of the television set 10. The main system 14 is constituted by a display portion for displaying and reproducing the video data, a video processing portion for encoding and decoding video data and the like, for example.

According to this embodiment, the CPU 12 is formed to establish the home network 1 on the in-home coaxial wiring 2 when a frequency band allocated for transmitting the digital television broadcast signal on the in-home coaxial wiring 2 includes a free frequency band having a bandwidth larger by a prescribed bandwidth than the bandwidth of the network signal. In the following description, it is assumed that the CPU 12 establishes the home network 1 complying with the MoCA standard on the in-home coaxial wiring 2 when a frequency band (frequency band from 54 MHz to 864 MHz)

for digital television broadcasting according to the ATSC standard on the in-home coaxial wiring 2 includes a free frequency band having a bandwidth (bandwidth of at least 100 MHz) at least twice the bandwidth (50 MHz) of the network signal according to the MoCA standard.

Figure 4:
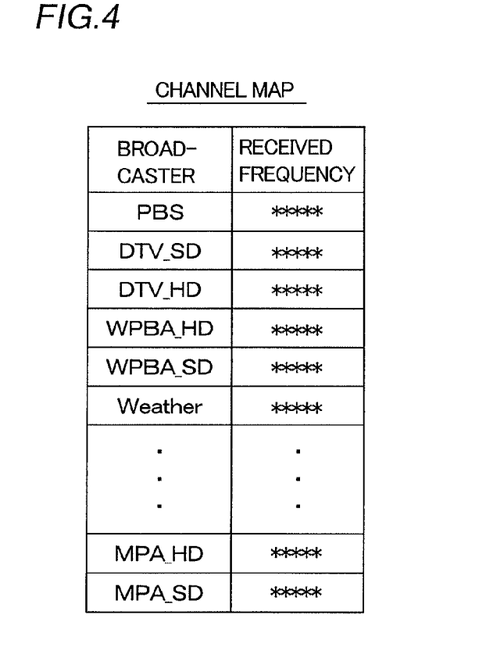
FIG. 4 is an image diagram showing a channel map prepared by the television set according to the embodiment of the present invention.

The CPU 12 is formed to scan the digital television broadcast signal through the receiving portion 113 and determine whether or not the frequency band for digital television broadcasting according to the ATSC standard on the in-home coaxial wiring 2 includes the free frequency band described above on the basis of the result of the scanning. Specifically, the CPU 12 successively scans the digital television broadcast signal according to the ATSC standard transmitted on the in-home coaxial wiring 2 successively changing a frequency received by the receiving portion 113, thereby preparing the channel map (see FIG. 4). The channel map is a list of frequency bands that respective digital television broadcast signals distributed by broadcasters employ, as shown in FIG. 4. Then, the CPU 12 refers to the prepared channel map thereby determining whether or not the frequency band (frequency band from 54 MHz to 864 MHz) for digital television broadcasting according to the ATSC standard on the in-home coaxial wiring 2 includes the free frequency band having a bandwidth of at least 100 MHz.

The CPU 12 is formed to adjust the frequency band of the network signal such that the center frequency of the network signal is substantially equal to the center frequency of the free frequency band described above and transmit the network signal through the transmitting portion 112 when establishing the home network 1 on the in-home coaxial wiring 2. For example, the CPU 12 forms a communication channel X for transmitting/receiving the network signal according to the MoCA standard such that the center frequency f0 of the communication channel X is substantially equal to the center frequency (an arithmetic average between the lower limit frequency f1 and the upper limit frequency f2 of a free frequency band R1) of the free frequency band R1 when establishing the home network 1 complying with the MoCA standard on the in-home coaxial wiring 2, as shown in FIG. 2. The communication channel X is a communication channel following communication channels (channels A1, B1, C1 to C4 and D1 to D8) according to the MoCA standard and has a bandwidth of 50 MHz.

The CPU 12 is formed to establish the home network 1 employing a free frequency band having the largest bandwidth among a plurality of free frequency bands when there are the plurality of free frequency bands. When the frequency band (frequency band from 54 MHz to 864 MHz) for digital television broadcasting according to the ATSC standard on the in-home coaxial wiring 2 includes two free frequency bands (free frequency bands R1 and R2) each having a bandwidth of at least 100 MHz as shown in FIG. 2, for example, the CPU 12 forms the communication channel X for transmitting/receiving the network signal according to the MoCA standard in a free frequency band (free frequency band R1 in FIG. 2) having a larger bandwidth.

The CPU 12 is formed to establish the home network 1 on the in-home coaxial wiring 2 by selectively employing the fourteen communication channels (channels A1, B1, C1 to C4 and D1 to D8 (see FIG. 2)) set forth by the MoCA standard to transmit/receive the network signal when the frequency band (frequency band from 54 MHz to 864 MHz) for digital television broadcasting according to the ATSC standard on the in-home coaxial wiring 2 does not include the free frequency band having a bandwidth of at least 100 MHz.

The CPU 12 is formed to determine again whether or not there is a free frequency band on the in-home coaxial wiring 2 on the basis of the channel map (see FIG. 4) stored in the memory 13 and reestablish the home network 1 on the in-home coaxial wiring 2 on the basis of the result of the determination when the home network 1 is not properly established on the in-home coaxial wiring 2.

Next, processing of the CPU 12 for establishing the home network 1 in the television set 10 according to the embodiment of the present invention is described with reference to FIG. 5.

Figure 5:
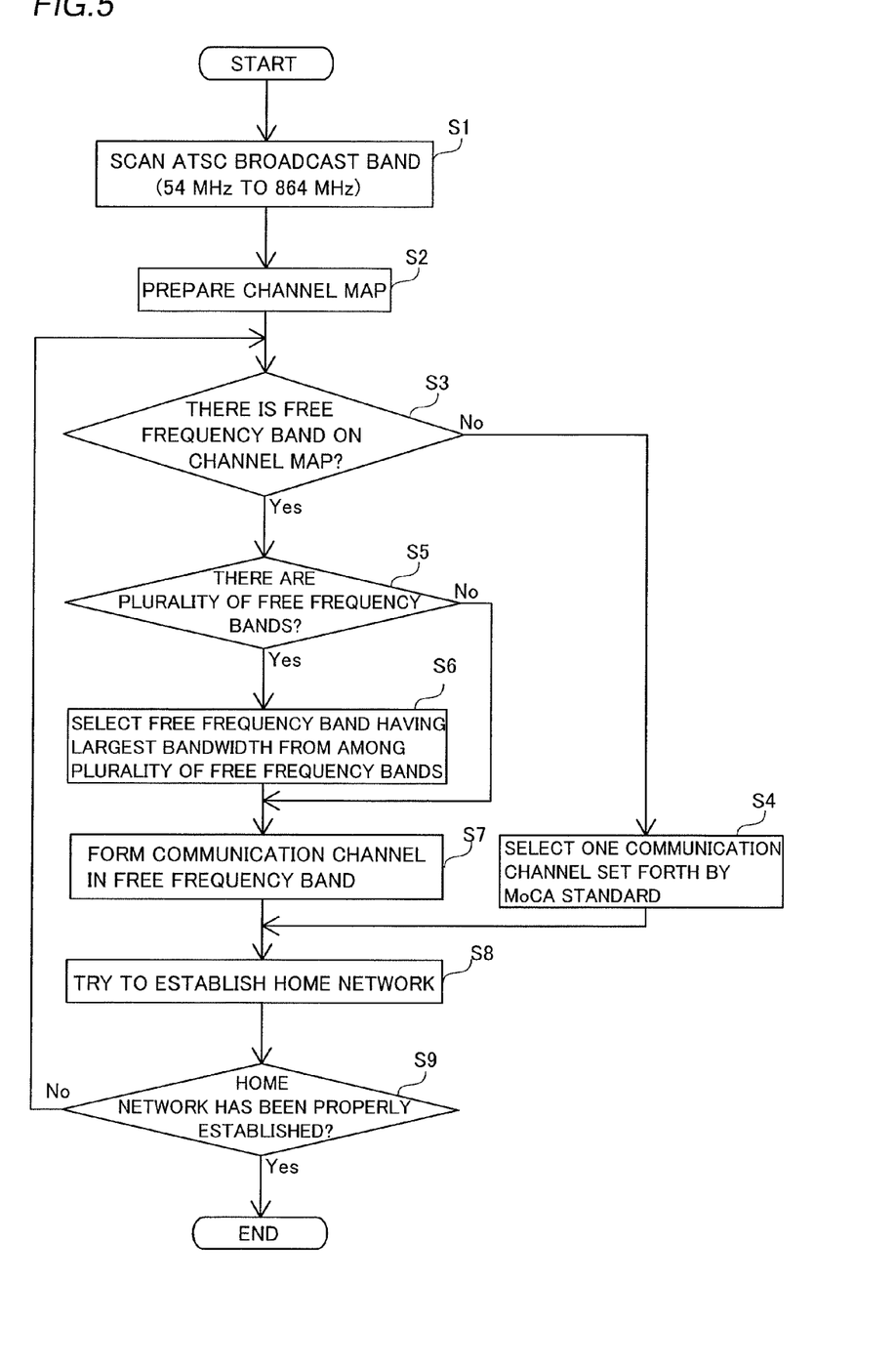
FIG. 5 is a flowchart for illustrating a control operation of a CPU in establishing the home network by the television set according to the embodiment of the present invention.

First, the CPU 12 scans the digital television broadcast signal according to the ATSC standard through the receiving portion 113 at a step S1, and advances to a step S2, as shown in FIG. 5. Then, at the step S2, the CPU 12 prepares the channel map (see FIG. 4) on the basis of the result of the aforementioned scanning at the step S1, and advances to a step S3. The channel map prepared in this manner is stored in the memory 13.

At the step S3, the CPU 12 determines whether or not there is the free frequency band having a bandwidth of at least 100 MHz on the aforementioned channel map (see FIG. 4) prepared at the step S2. If determining that there is no free frequency band having a bandwidth of at least 100 MHz on the channel map at the step S3, the CPU 12 advances to a step S4. At the step S4, the CPU 12 selects one channel from among the fourteen channels (channels A1, B1, C1 to C4 and D1 to D8 (see FIG. 2)) set forth by the MoCA standard, and advances to a step S8 described later.

If determining that there is the free frequency band having a bandwidth of at least 100 MHz on the channel map (see FIG. 4) at the aforementioned step S3, the CPU 12 advances to a step S5. At the step S5, the CPU 12 determines whether or not a plurality of free frequency bands have been detected at the aforementioned step S3. If determining at the step S5 that one free frequency band has been detected at the step S3, the CPU 12 advances to a step S7 described later.

If determining at the aforementioned step S5 that the plurality of free frequency bands have been detected at the step S3 (if detecting the free frequency bands R1 and R2 shown in FIG. 2, for example), the CPU 12 advances to a step S6. At the step S6, the CPU 12 selects a free frequency band (free frequency band R1 in FIG. 2) having the largest bandwidth from among the plurality of free frequency bands having been detected at the aforementioned step S3 (step S5), and advances to the step S7.

At the step S7, the CPU 12 forms a communication channel (communication channel X shown in FIG. 2, for example) for transmitting/receiving the network signal such as a beacon signal according to the MoCA standard in the aforementioned free frequency band selected at the step S6 or the single frequency band having been detected at the step S3 (step S5), and advances to the step S8. This communication channel is formed such that the center frequency thereof is substantially equal to the center frequency of the free frequency band. For example, the communication channel X shown in FIG. 2 is formed such that the center frequency f0 thereof is substantially equal to the center frequency (the arithmetic average between the lower limit frequency f1 and the upper limit frequency f2 of the free frequency band R1) of the free frequency band R1.

At the step S8, the CPU 12 tries to establish the home network 1, and advances to a step S9. Specifically, the CPU 12 performs processing for transmitting the beacon signal to the transmitting portion 112 through the aforementioned communication channel formed at the step S7 or the aforementioned communication channel selected at the step S4.

At the step S9, the CPU 12 determines whether or not the home network 1 has been properly established on the in-home coaxial wiring 2. Specifically, the CPU 12 determines whether or not the receiving portion 113 has received a signal that other devices (the PC 20 and the set-top box 30 (see FIG. 1)) on the in-home coaxial wiring 2 wish to join the home network 1 corresponding to the aforementioned beacon signal at the step S8 from the devices. If determining that the home network 1 has not been properly established at the step S9, the CPU 12 returns to the aforementioned step S3. If determining that the home network 1 has been properly established at the step S9, the CPU 12 terminates the processing. The aforementioned processing at the steps S1 to S9 is repeatedly performed while the television set 10 is on.

According to this embodiment, as hereinabove described, the CPU 12 is formed to establish the home network 1 complying with the MoCA standard on the in-home coaxial wiring 2 when the frequency band (frequency band from 54 MHz to 864 MHz) allocated for transmitting the digital television broadcast signal according to the ATSC standard on the in-home coaxial wiring 2 includes the free frequency band (the free frequency band having a bandwidth of at least 100 MHz) having a bandwidth larger by the prescribed bandwidth than the bandwidth (50 MHz) of the network signal according to the MoCA standard. Thus, a free frequency band having a prescribed bandwidth can be provided between the network signal and the digital television broadcast signal when the home network 1 is established by employing the free frequency band on the in-home coaxial wiring 2 to transmit the network signal, and hence the network signal and the digital television broadcast signal can be inhibited from interfering with each other. Consequently, the quality of the digital television broadcast signal can be inhibited from deterioration when the home network 1 is established employing the free frequency band in the frequency band allocated for transmitting the digital television broadcast signal on the in-home coaxial wiring 2. It is not necessary to secure a frequency band dedicated for transmission of the network signal on the in-home coaxial wiring 2 when the home network 1 can be established employing the free frequency band in the frequency band allocated for transmitting the digital television broadcast signal on the in-home coaxial wiring 2. Thus, the bandwidth of a frequency band that can be employed by a service provider utilizing the in-home coaxial wiring 2 to provide a new service can be increased.

According to this embodiment, as hereinabove described, the CPU 12 is formed to determine whether or not the frequency band (frequency band from 54 MHz to 864 MHz) allocated for transmitting the digital television broadcast signal on the in-home coaxial wiring 2 includes the free frequency band having a bandwidth of at least 100 MHz on the basis of the result (channel map (see FIG. 4)) of the scanning of the digital television broadcast signal. Thus, the presence of the free frequency band in the frequency band allocated for transmitting the digital television broadcast signal on the in-home coaxial wiring 2 can be easily detected on the basis of the result (channel map (see FIG. 4)) of the scanning of the digital television broadcast signal.

According to this embodiment, as hereinabove described, the CPU 12 is formed to adjust the frequency band of the network signal such that the center frequency of the network signal is substantially equal to the center frequency of the free frequency band and transmit the network signal through the transmitting portion 112 when establishing the home network 1 on the in-home coaxial wiring 2 by transmitting the network signal through the transmission portion. Thus, the free frequency band can be reliably provided on both sides closer to the lower limit frequency and the upper limit frequency of the network signal dissimilarly to a case where the center frequency of the network signal deviates from the center frequency of the free frequency band, and hence the quality of the digital television broadcast signal can be reliably inhibited from deterioration.

Figure 2:
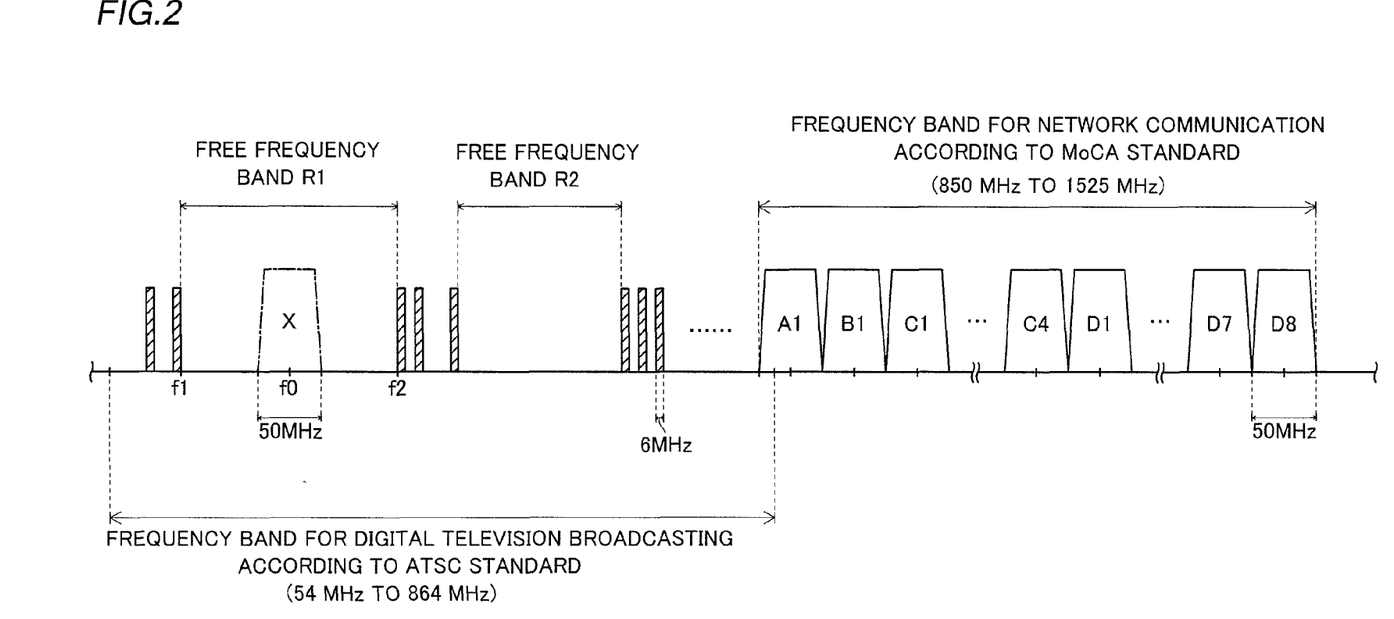
FIG. 2 is an image diagram showing an arrangement of frequencies of a digital television broadcast signal and a network signal transmitted on in-home coaxial wiring connected with the television set according to the embodiment of the present invention.

According to this embodiment, as hereinabove described, the CPU 12 is formed to establish the home network 1 employing the free frequency band (free frequency band R1 in FIG. 2) having the largest bandwidth among the plurality of free frequency bands when there are the plurality of free frequency bands (when there are the two free frequency bands R1 and R2 as shown in FIG. 2, for example). Thus, the bandwidth of the free frequency band in the frequency band allocated for transmitting the digital television broadcast signal on the in-home coaxial 2 can be rendered the largest among available free frequency bands, and hence the quality of the digital television broadcast signal can be further inhibited from deterioration.

According to this embodiment, as hereinabove described, the CPU 12 is formed to establish the home network 1 on the in-home coaxial wiring 2 employing a prescribed frequency band (frequency band (frequency band from 850 MHz to 1525 MHz) set forth by the MoCA standard) previously set other than the frequency band allocated for transmitting the digital television broadcast signal when the frequency band (frequency band from 54 MHz to 864 MHz) allocated for transmitting the digital television broadcast signal on the in-home coaxial wiring 2 does not include the free frequency band having a bandwidth of at least 100 MHz. Thus, the network signal can be transmitted employing the prescribed frequency band previously set other than the frequency band allocated for transmitting the digital television broadcast signal on the coaxial wiring even if the frequency band allocated for transmitting the digital television broadcast signal on the in-home coaxial wiring 2 does not include the free frequency band for transmitting the network signal, and hence the home network 1 can be reliably established on the in-home coaxial wiring 2.

According to this embodiment, as hereinabove described, the CPU 12 is formed to determine again whether or not the frequency band (frequency band from 54 MHz to 864 MHz) allocated for transmitting the digital television broadcast signal on the in-home coaxial wiring 2 includes the free frequency band on the basis of the channel map (see FIG. 4) stored in the memory 13 and reestablish the home network 1 on the in-home coaxial wiring 2 on the basis of the result of the determination when the home network 1 is not properly established on the in-home coaxial wiring 2. Thus, the free frequency band employed when the home network 1 is reestablished can be easily detected on the basis of the channel map (see FIG. 4) stored in the memory 13.

According to this embodiment, as hereinabove described, the CPU 12 is formed to establish the home network 1 on the in-home coaxial wiring 2 when the frequency band (frequency band from 54 MHz to 864 MHz) allocated for transmitting the digital television broadcast signal on the in-home coaxial wiring 2 includes the free frequency band having a bandwidth (at least 100 MHz) at least twice the bandwidth of the network signal. Thus, the free frequency band can be easily provided between the network signal and the digital television broadcast signal when the home network 1 is established by employing the free frequency band on the in-home coaxial wiring 2 to transmit the network signal, and hence the network signal and the digital television broadcast signal can be easily inhibited from interfering with each other. Consequently, the quality of the digital television broadcast signal can be easily inhibited from deterioration when the home network 1 is established employing the free frequency band in the frequency band allocated for transmitting the digital television broadcast signal on the in-home coaxial wiring 2.

Although the present invention has been described and illustrated in detail, it is clearly understood that the same is by way of illustration and example only and is not to be taken by way of limitation, the spirit and scope of the present invention being limited only by the terms of the appended claims.

For example, while the television set is employed as the broadcasting receiver of the present invention in the aforementioned embodiment, the present invention is not restricted to this. In the present invention, a set-top box, a PC or the like may alternatively be employed as the broadcasting receiver.

While the television set establishing the network employing the free frequency band in the frequency band for digital television broadcasting according to the ATSC standard has been shown in the aforementioned embodiment, the present invention is not restricted to this. The present invention may alternatively be applied to a television set establishing a network employing a free frequency band in a frequency band for digital television broadcasting according to another standard (ISBD standard (Integrated Services Digital Broadcasting standard), for example) other than the ATSC standard.

While the television set establishing the network complying with the MoCA standard on the coaxial wiring has been shown in the aforementioned embodiment, the present invention is not restricted to this. The present invention may alternatively be applied to a television set establishing a network complying with another standard (DOCSIS standard (Data Over Cable Service Interface Specifications standard), for example) other than the MoCA standard on coaxial wiring.

While the television set establishing the network employing the free frequency band having a bandwidth (at least 100 MHz) at least twice the bandwidth (50 MHz) of the network signal has been shown in the aforementioned embodiment, the present invention is not restricted to this. The present invention can be applied to any television set as long as the television set establishes a network employing the free frequency band having a bandwidth larger by the prescribed bandwidth than the bandwidth of the network signal.

What is claimed is:

1. A broadcasting receiver comprising:
    a receiving portion receiving a digital television broadcast signal through coaxial wiring;
    a transmitting portion transmitting a network signal having a bandwidth larger than that of said digital television broadcast signal through said coaxial wiring; and
    a control portion setting a transmitting frequency of said transmitting portion to a free frequency band when a frequency band allocated for transmitting said digital television broadcast signal on said coaxial wiring includes said free frequency band, wherein
    said free frequency band includes a plurality of free frequency bands, and
    said control portion establishes said network signal employing a free frequency band having the largest bandwidth from among the plurality of free frequency bands.

2. The broadcasting receiver according to claim 1, wherein said control portion scans said digital television broadcast signal through said receiving portion and determine whether or not said frequency band allocated for transmitting said digital television broadcast signal on said coaxial wiring includes said free frequency band having said bandwidth larger by said prescribed bandwidth than said bandwidth of said network signal on the basis of a result of scanning of said digital television broadcast signal.

3. The broadcasting receiver according to claim 2, wherein said control portion prepares a channel map by scanning said digital television broadcast signal and determines whether or not said frequency band allocated for transmitting said digital television broadcast signal on said coaxial wiring includes said free frequency band having said bandwidth larger by said prescribed bandwidth than said bandwidth of said network signal on the basis of prepared said channel map.

4. The broadcasting receiver according to claim 2, further comprising a storage portion storing said result of scanning of said digital television broadcast signal, wherein
    said control portion determines again whether or not said frequency band allocated for transmitting said digital television broadcast signal on said coaxial wiring includes said free frequency band having said bandwidth larger by said prescribed bandwidth than said bandwidth of said network signal on the basis of said result of scanning of said digital television broadcast signal stored in said storage portion and reestablishes said network on said coaxial wiring on the basis of a result of determination when said network is not properly established on said coaxial wiring.

5. The broadcasting receiver according to claim 1, wherein said control portion adjusts a frequency band of said network signal such that a center frequency of said network signal is substantially equal to a center frequency of said free frequency band and transmits said network signal through said transmitting portion when establishing said network on said coaxial wiring by transmitting said network signal through said transmitting portion.

6. The broadcasting receiver according to claim 1, wherein said control portion establishes said network on said coaxial wiring employing a prescribed frequency band previously set other than said frequency band allocated for transmitting said digital television broadcast signal when said frequency band allocated for transmitting said digital television broadcast signal on said coaxial wiring does not include said free frequency band having said bandwidth larger by said prescribed bandwidth than said bandwidth of said network signal.

7. The broadcasting receiver according to claim 1, wherein said control portion establishes said network on said coaxial wiring when said frequency band allocated for transmitting said digital television broadcast signal on said coaxial wiring includes said free frequency band having a bandwidth at least twice said bandwidth of said network signal.

8. The broadcasting receiver according to claim 1, wherein said transmitting portion transmits said network signal complying with a MoCA standard, and
    said control portion establishes said network complying with the MoCA standard on said coaxial wiring when said frequency band allocated for transmitting said digital television broadcast signal on said coaxial wiring includes said free frequency band having a bandwidth larger by a prescribed bandwidth than a bandwidth of said network signal complying with the MoCA standard.

9. The broadcasting receiver according to claim 8, wherein said control portion establishes said network complying with the MoCA standard on said coaxial wiring when said broadcasting receiver functions as a management apparatus managing said network complying with the MoCA standard.

10. The broadcasting receiver according to claim 1, further comprising:
a switch portion switches between a connection between the coaxial cable and said transmitting portion and a connection between said coaxial wiring and said receiving portion in an alternative way,
wherein said control portion switches said switch portion so as to connect between said coaxial wiring and said transmitting portion.

11. A television set comprising:
a receiving portion receiving a digital television broadcast signal through coaxial wiring;
a transmitting portion transmitting a network signal having a bandwidth larger than that of said digital television broadcast signal through said coaxial wiring; and
a control portion setting a transmitting frequency of said transmitting portion to a free frequency band when a frequency band allocated for transmitting said digital television broadcast signal on said coaxial wiring includes said free frequency band, wherein
said free frequency band includes a plurality of free frequency bands, and
said control portion establishes said network signal employing a free frequency band having the largest bandwidth from among the plurality of free frequency bands.

12. The television set according to claim 11, wherein
said control portion scans said digital television broadcast signal through said receiving portion and determines whether or not said frequency band allocated for transmitting said digital television broadcast signal on said coaxial wiring includes said free frequency band having said bandwidth larger by said prescribed bandwidth than said bandwidth of said network signal on the basis of a result of scanning of said digital television broadcast signal.

13. The television set according to claim 12, wherein
said control portion prepares a channel map by scanning said digital television broadcast signal and determines whether or not said frequency band allocated for transmitting said digital television broadcast signal on said coaxial wiring includes said free frequency band having said bandwidth larger by said prescribed bandwidth than said bandwidth of said network signal on the basis of prepared said channel map.

14. The television set according to claim 12, further comprising a storage portion storing said result of scanning of said digital television broadcast signal, wherein
said control portion determines again whether or not said frequency band allocated for transmitting said digital television broadcast signal on said coaxial wiring includes said free frequency band having said bandwidth larger by said prescribed bandwidth than said bandwidth of said network signal on the basis of said result of scanning of said digital television broadcast signal stored in said storage portion and reestablishes said network on said coaxial wiring on the basis of a result of determination when said network is not properly established on said coaxial wiring.

15. The television set according to claim 11, wherein
said control portion adjusts a frequency band of said network signal such that a center frequency of said network signal is substantially equal to a center frequency of said free frequency band and transmits said network signal through said transmitting portion when establishing said network on said coaxial wiring by transmitting said network signal through said transmitting portion.

16. The television set according to claim 11, wherein
said control portion establishes said network on said coaxial wiring employing a prescribed frequency band previously set other than said frequency band allocated for transmitting said digital television broadcast signal when said frequency band allocated for transmitting said digital television broadcast signal on said coaxial wiring does not include said free frequency band having said bandwidth larger by said prescribed bandwidth than said bandwidth of said network signal.

17. The television set according to claim 11, wherein
said control portion establishes said network on said coaxial wiring when said frequency band allocated for transmitting said digital television broadcast signal on said coaxial wiring includes said free frequency band having a bandwidth at least twice said bandwidth of said network signal.

18. The television set according to claim 11, wherein
said transmitting portion transmits said network signal complying with a MoCA standard, and
said control portion establishes said network complying with the MoCA standard on said coaxial wiring when said frequency band allocated for transmitting said digital television broadcast signal on said coaxial wiring includes said free frequency band having a bandwidth larger by a prescribed bandwidth than a bandwidth of said network signal complying with the MoCA standard.

19. The television set according to claim 18, wherein
said control portion establishes said network complying with the MoCA standard on said coaxial wiring when said television set functions as a management apparatus managing said network complying with the MoCA standard.

* * * * *